United States Patent
Sakai et al.

(10) Patent No.: US 7,976,599 B2
(45) Date of Patent: Jul. 12, 2011

(54) CLEAN BENCH AND METHOD OF PRODUCING RAW MATERIAL FOR SINGLE CRYSTAL SILICON

(75) Inventors: Kazuhiro Sakai, Yokkaichi (JP); Yukiyasu Miyata, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 4 days.

(21) Appl. No.: 12/230,592

(22) Filed: Sep. 2, 2008

(65) Prior Publication Data
US 2009/0081108 A1 Mar. 26, 2009

(30) Foreign Application Priority Data

Sep. 4, 2007 (JP) ................. 2007-229211
Jun. 27, 2008 (JP) ................. 2008-168497

(51) Int. Cl.
*B01D 50/00* (2006.01)
(52) U.S. Cl. ............ 55/385.1; 55/385.2; 55/DIG. 18; 422/104; 422/121
(58) Field of Classification Search ............ 422/104, 422/121; 55/385.1, 385.2, DIG. 18
See application file for complete search history.

(56) References Cited

U.S. PATENT DOCUMENTS
2006/0279897 A1* 12/2006 Mizuno et al. ............. 361/220

FOREIGN PATENT DOCUMENTS
| EP | 1397030 A1 | 3/2004 |
| JP | 07-149930 A | 6/1995 |
| JP | 2001-308158 A | 11/2001 |
| JP | 2005-279576 | 10/2005 |

OTHER PUBLICATIONS

European Search Report dated Jul. 17, 2009, issued on the corresponding European patent application No. 08163533.6.

* cited by examiner

*Primary Examiner* — Jerry Lorengo
*Assistant Examiner* — Pritesh Darji
(74) *Attorney, Agent, or Firm* — Edwards Angell Palmer & Dodge LLP

(57) ABSTRACT

A clean bench comprising a worktable on which polycrystalline silicon is placed, a box part which includes side plates to surround three sides except a front face of a working space above the worktable, and a ceiling plate which covers an upper side of the working space. Supplying holes are formed in the ceiling plate of the box part, which supply clean air onto an upper surface of the worktable. An ionizer is provided, which ionizes the clean air supplied from the supplying holes to the working space and removes static electricity on the worktable. Suction holes are formed in the side plate of the box part, which suction air from the working space.

5 Claims, 4 Drawing Sheets

CLEAN BENCH AND METHOD OF PRODUCING RAW MATERIAL FOR SINGLE CRYSTAL SILICON

Priority is claimed on Japanese Patent Application No. 2007-229211, filed Sep. 4, 2007, and Japanese Patent Application No. 2008-168497, filed Jun. 27, 2008, the contents of which are incorporated herein by reference.

BACKGROUND OF THE INVENTION

1. Field of the Invention

The present invention relates to a clean bench used to sort polycrystalline silicon according to size or quality, which is used as a raw material to be melted in producing single crystal silicon, and a method of producing a raw material for single crystal silicon including a process for cleaning the polycrystalline silicon.

2. Description of the Related Art

Generally, in producing polycrystalline silicon for use as a raw material of single crystal silicon, a heated silicon seed rod is exposed to raw gas including chlorosilane gas and hydrogen gas. Polycrystalline silicon is deposited in a cylindrical shape from the silicon seed rod, and crushed into lumps with proper size or cut into rods with a predetermined length, thereby providing a raw material for single crystal silicon. The polycrystalline silicon, a raw material for single crystal silicon, is packed and sent to a single crystal silicon producing factory. Before packing, the polycrystalline silicon is manually sorted according to size or quality. Such a sorting process is carried out, for example, in a clean bench, as illustrated in Japanese Unexamined Patent Application, First Publication No. 2005-279576. The clean bench includes a blower to supply air to a working space formed on a worktable through an air supplying high-performance filter and an suction hole to suction air from the working space. The working space is continually supplied with clean air through the blower and the suction hole, so that cleanliness on the worktable is kept highly. Accordingly, when polycrystalline silicon is sorted, this process prevents impurities from adhering to the polycrystalline silicon and particle of polycrystalline silicon itself is removed by the flow of clean air. As a result, the quality of single crystal silicon to be produced can be improved.

By the way, when sorting by size or quality of polycrystalline silicon is conducted in a clean bench, if particles are charged, the particle electrostatically adheres to the polycrystalline silicon. Thus, the particle cannot be removed by the flow of clean air. The required removal effect can not be achieved.

Therefore, it is an object of the present invention to provide a clean bench which is capable of preventing particle from adhering to polycrystalline silicon to maintain the quality of single crystal silicon to be produced, the clean bench being used to sort the polycrystalline silicon according to size and quality, and a method for producing a raw material of single crystal silicon.

SUMMARY OF THE INVENTION

The present invention employs the followings in order to achieve the above described object.

Namely, a clean bench of the present invention includes: a worktable on which polycrystalline silicon is placed; and a box part which includes side plates to surround three sides except a front face of a working space above the worktable, and a ceiling plate which covers an upper side of the working space, wherein: supplying holes are formed in the ceiling plate of the box part, which supply clean air onto an upper surface of the worktable; an ionizer is provided, which ionizes the clean air supplied from the supplying holes to the working space and removes static electricity on the worktable; and suction holes are formed to the side plate of the box part, which suction air from the working space.

According to the above described the clean bench, clean air is supplied through the supplying hole on the worktable surrounded by the three sides except for the front side, and air around the upper side of the worktable is suctioned through the suction hole, thereby keeping the upper side of the worktable clean. Accordingly, polycrystalline silicon to be placed on the worktable can be kept high in purity. As a result, single crystal silicon produced from polycrystalline silicon used as a raw material is not deteriorated in quality.

Moreover, in the clean bench according to the present invention, clean air is ionized by the ionizer to be sprayed on the worktable. The clean air includes positive and negative ions. Thus, when the particle of polycrystalline silicon is charged, the positive and negative ions of the clean air are electrically neutralized with the static electricity of the particle. Accordingly, the static electricity on the particle is eliminated. The particle, from which static electricity is removed, loses adhesive power, and thus it does not adhere to the polycrystalline silicon but is suctioned to the suction hole by the flow of the clean air. Then, the particle is removed from the surface of the worktable. As a result, the particle can be easily eliminated. Accordingly, it is possible to maintain high quality of single crystal silicon produced with polycrystalline silicon as a raw material.

Moreover, the clean air containing of positive and negative ions can be supplied by the ionizer to the upper side of the worktable to remove the static electricity of the particle on polycrystalline silicon, thereby easily eliminating the particle. As a result, single crystal silicon produced from the polycrystalline silicon as a raw material can be improved in quality.

It is also possible that the clean bench further comprises a communicative route which communicates between the suction holes and the supplying holes; a blower which supplies the clean air to the working space; and a filter which removes particles from the clean air supplied from the blower, wherein the filter and the blower are provided in the communicative route.

In this case, air suctioned through the suction hole is purified through the filter and sent to the worktable by the blower through the supplying hole, thereby circulating the air. Accordingly, the upper side of the worktable can be kept clean highly.

It is also possible that the filter comprises: a first filter which is arranged at an upstream side of the blower for removing particles having diameter larger than a predetermined size; and a second filter which is arranged at a downstream side of the blower for removing particles which passed the first filter.

Here, if the particle, which is removed from the upper side of the worktable along with air suctioned to the suction hole, goes directly into the blower, it may obstruct a driving of the blower. In the invention, however, the particle removing filter is provided to the communicative route communicating between the suction hole and the blower. Thus, since the particle can be thoroughly removed by the particle removing filter from air to be sent to the blower, it does not obstruct a driving of the blower. Further, air sent from the blower is introduced to the supplying hole through the high-performance filter, and thus highly clean air can be supplied to the upper side of the worktable.

The method for producing a raw material for single crystal silicon of the present invention includes: depositing a column-shaped polycrystalline silicon by a reaction with raw gas including chlorosilane gas and hydrogen gas; crushing the column-shaped polycrystalline silicon into a plurality of lumps of polycrystalline silicon or cutting the column-shaped polycrystalline silicon into rod-shaped polycrystalline silicon with a predetermined length; washing the polycrystalline silicon using an acid to remove impurities adhering to a surface thereof; immersing the washed polycrystalline silicon in a pure water bath to remove the remaining acid from the surface thereof; drying the polycrystalline silicon taken out of the pure water bath by being put in a drier; and cleaning the polycrystalline silicon by removing static electricity from the surface of the polycrystalline silicon having been dried, wherein in the cleaning process, the polycrystalline silicon is cleaned by being exposed to the clean air on the worktable of the above described clean bench.

The method for producing a raw material for single crystal silicon of the present invention includes: depositing a column-shaped polycrystalline silicon by a reaction with raw gas including chlorosilane gas and hydrogen gas; crushing the column-shaped polycrystalline silicon into a plurality of lumps of polycrystalline silicon or cutting the column-shaped polycrystalline silicon into rod-shaped polycrystalline silicon with a predetermined length; washing the polycrystalline silicon using an acid to remove impurities adhering to the surface thereof; immersing the washed polycrystalline silicon in a pure water bath to remove the remaining acid from the surface of the polycrystalline silicon; drying the polycrystalline silicon taken out of the pure water bath by being put in a drier; and cleaning the polycrystalline silicon by removing static electricity from the surface of the polycrystalline silicon having been dried, wherein in the cleaning process, the polycrystalline silicon is exposed to clean air to remove static electricity by being put on a worktable while supplying ionized clean air toward the polycrystalline silicon and discharging the clean air to a side of the worktable.

According to the above described methods for producing a raw material for single crystal silicon, particle can be removed by ionized clean air from the surface of polycrystalline silicon. Thus, the polycrystalline silicon can be improved in quality as a raw material for single crystal silicon.

DETAILED DESCRIPTION OF THE INVENTION

Embodiments of the present invention will now be described with reference to the drawings.

Figure 1:
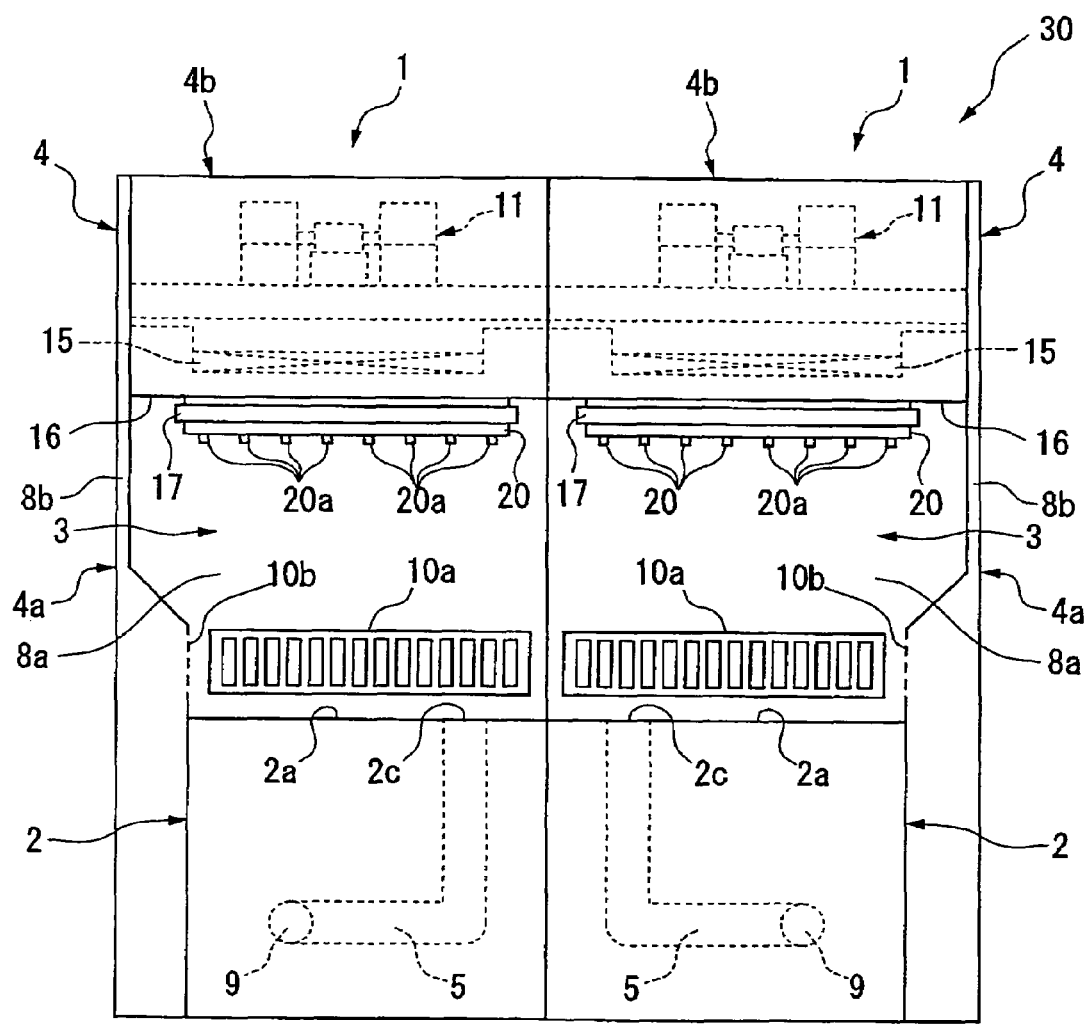
FIG. 1 is a schematic configuration view of a clean bench according to an embodiment of the present invention.
Figure 2:
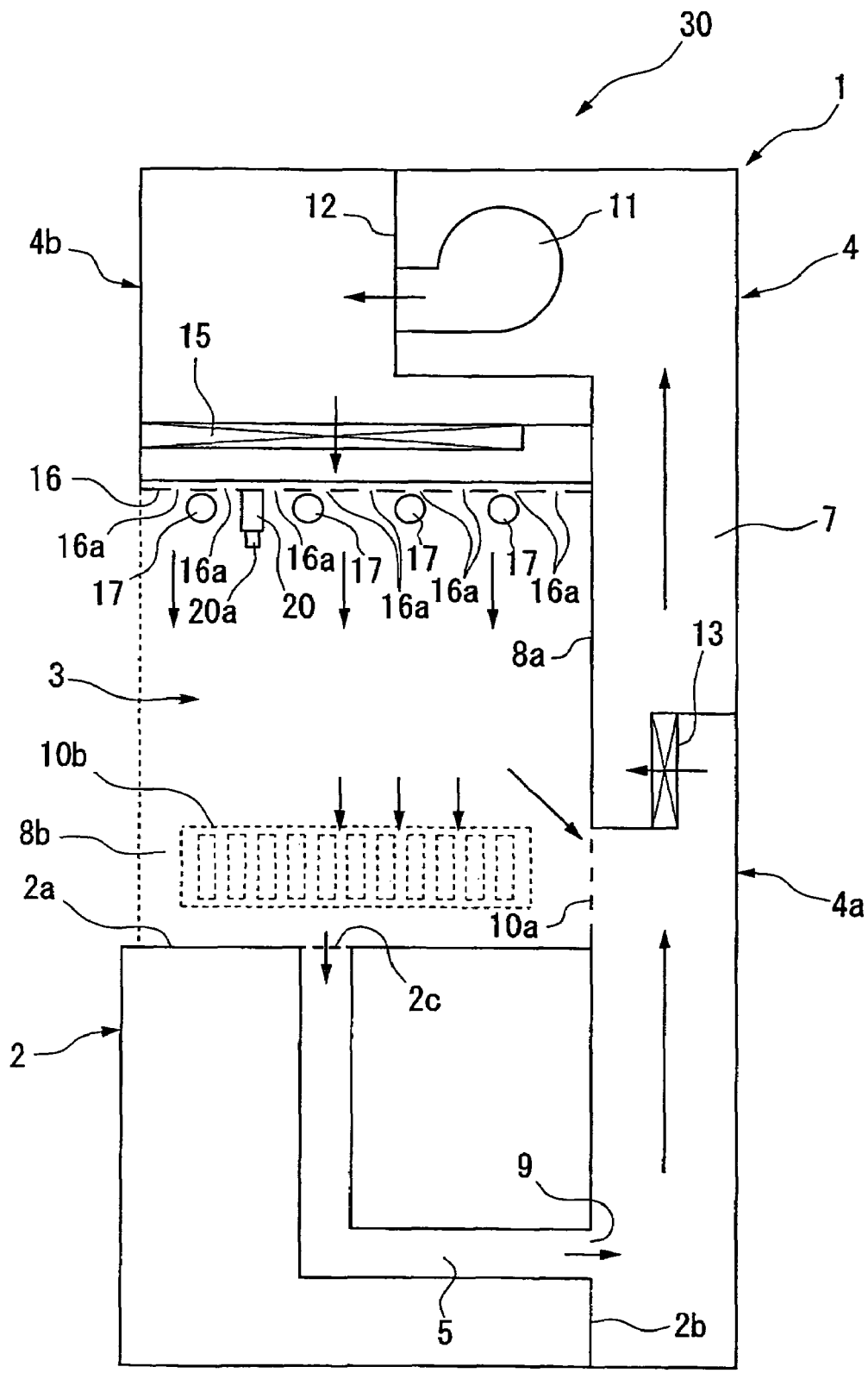
FIG. 2 is a lateral cross-sectional view to illustrate the flow of air in the clean bench unit according to the exemplary embodiment of the present invention.

FIG. 1 is a front view of a clean bench unit according to an exemplary embodiment of the present invention, and FIG. 2 is a lateral cross-sectional view to illustrate the flow of air in the clean bench unit. A clean bench unit 30, as shown in FIG. 1, includes two clean benches 1 provided side by side which have component parts symmetrically provided therein to each other. Each of the clean benches 1 schematically includes a worktable 2 above which a working space 3 is provided and a box (box part) 4. The box 4 includes a side plate 8a disposed at the rear side of the worktable 2 and the working space 3 (on the right side in FIG. 2), a side plate 8b disposed opposite to where the two clean benches 1 border each other, and a ceiling plate 16 to cover the upper sides of the side plates 8a and 8b.

The worktable 2 includes a working area 2a provided horizontally and with a predetermined height A worker extends their hand from a front side (the left side in FIG. 2) to sort polycrystalline silicon on the working surface 2a according to size and quality. Further, a worktable communicative route 5 is provided by allowing the working surface 2a to communicate with a lower side surface 2b of the worktable 2 bordering the side plate 8a of the box 4. The worktable communicative route 5 is opened on a portion of the working surface 2a, and the opening portion is a worktable suction hole 2c. The worktable suction hole 2c is covered by mesh.

The box 4, as described above, includes the side plates 8a and 8b to surround the worktable 2 and working space 3 at the lateral sides, and the ceiling plate 16 to cover the side plates 8a and 8b from the top. The box 4 is formed to be hollow inside. The box 4 is extending in the vertical direction with the side plates 8a and 8b being parallel with two lateral sides of the worktable 2. In addition, the box 4, as shown in FIG. 2, includes a vertically extending part 4a in which a blower 11 (mentioned later) is disposed in its upper inner part and an upper extending part 4b disposed the above the vertically extending part 4a to cover the working space 3 by the ceiling plate 16 from the top.

Inner of the vertically extending part 4a of the side plate 8a behind the worktable 2, as shown in FIG. 2, is a communicative route 7 which extends up and down A connecting part 9 is formed in the lower side surface 2b of the worktable 2 and the lower part of the side plate 8a to communicate the communicative route 7 with the worktable communicative route 5. Moreover, suction holes 10a are formed around an upper side of the worktable 2 in the side plate 8a of the vertically extending part 4a, and the working space 3 is communicated with the communicative route 7. Also, suction holes 10b are formed around an upper side of the worktable 2 in the side plate 8b toward a lateral side of the clean bench unit 30, and the working space 3 is communicated with the communicative route 7.

The blower 11 provided in the upper inner part of the vertically extending part 4a is disposed to contact with a partition 12 dividing the vertically extending part 4a from the upper extending part 4b. The blower 11 suctions air in the communicative route 7 in the vertically extending part 4a and sends the air to the upper extending part 4b. In addition, a particle removing filter (first filter) 13 is provided between the blower 11 in the communicative route 7 and the suction holes 10a, 10b (an upstream side of the blower 11). Air suctioned through the suction holes 10a, 10b and the worktable suction hole 2c is sent to the blower 11 through the particle removing filter 13. The particle removing filter 13 can, for example, remove particles having a diameter range of approximately 10 μm or greater.

The upper extending part 4b is formed as a single body with the vertically extending part 4a via the partition 12. A high-performance filter (second filter) 15 with a flat plate shape is provided in the upper extending part 4b under the partition 12 at a predetermined distance from the lower part of the partition 12 (the downstream side of the blower 11). In the present embodiment, the high-performance filter 15 is formed of a HEPA filter which can greatly remove particles (with a diameter range of, for example, 0.3 µm or greater) included in air passing therethrough to obtain a cleanliness of about 100%. Air sent into the upper extending part 4b through the blower 11 becomes clean air through the high-performance filter 15.

A plurality of holes is provided in the ceiling plate 16 of the upper extending part to cover the working space 3. The plurality of holes are supplying holes 16a to supply clean air to the working space 3. Air passing through the high-performance filter 15 is uniformly supplied to a lower part of the working space 3 in the end through the plurality of supplying holes 16a of the ceiling plate 16. A plurality of illuminators 17 (four in the present embodiment), for example fluorescent lamps, is provided on a lower side of the ceiling plate 16 (one side of the working space 3). The illuminators 17 are disposed at regular intervals in the horizontal direction to illuminate the entire working surface 2a of the worktable 2.

An ionizer 20 is provided on the lower side of the ceiling plate 16 (one side of the working space 3) as disposed with the plurality of illuminators 17. A plurality of nozzles 20a (eight in the present embodiment) is provided on the ionizer 20 to face downward. The ionizer 20 serves to ionize a portion of clean air positively or negatively, which is to be supplied to the working space 3 through the supplying holes 16a of the ceiling plate 16, by corona discharge or the like to be supplied through the nozzles 20a. The ionizer 20 may be various types of conventional ionizer which can ionize clean air by a variety of methods, for example using UV rays, light X rays, and a radioactive material in addition to corona discharge.

Hereinafter, a method of preparing polycrystalline silicon used for a raw material of single crystal silicon using the aforementioned clean bench unit 30 will be described.

The method includes depositing a column-shaped polycrystalline silicon by a reaction with raw gas including chlorosilane gas and hydrogen gas; crushing the column-shaped polycrystalline silicon into a plurality of lumps of polycrystalline silicon or cutting the column-shaped polycrystalline silicon into rod-shaped polycrystalline silicon with a predetermined length; washing the polycrystalline silicon using an acid to remove impurities adhering to the surface thereof; immersing the washed polycrystalline silicon in a pure water bath to remove the remaining acid from the surface thereof; drying the polycrystalline silicon having been taken out of the pure water bath by being put in a drier; cleaning the polycrystalline silicon by removing static electricity from the surface of the polycrystalline silicon having been dried; and packing the polycrystalline silicon for forwarding to a factory of producing single crystal silicon.

Figure 3:
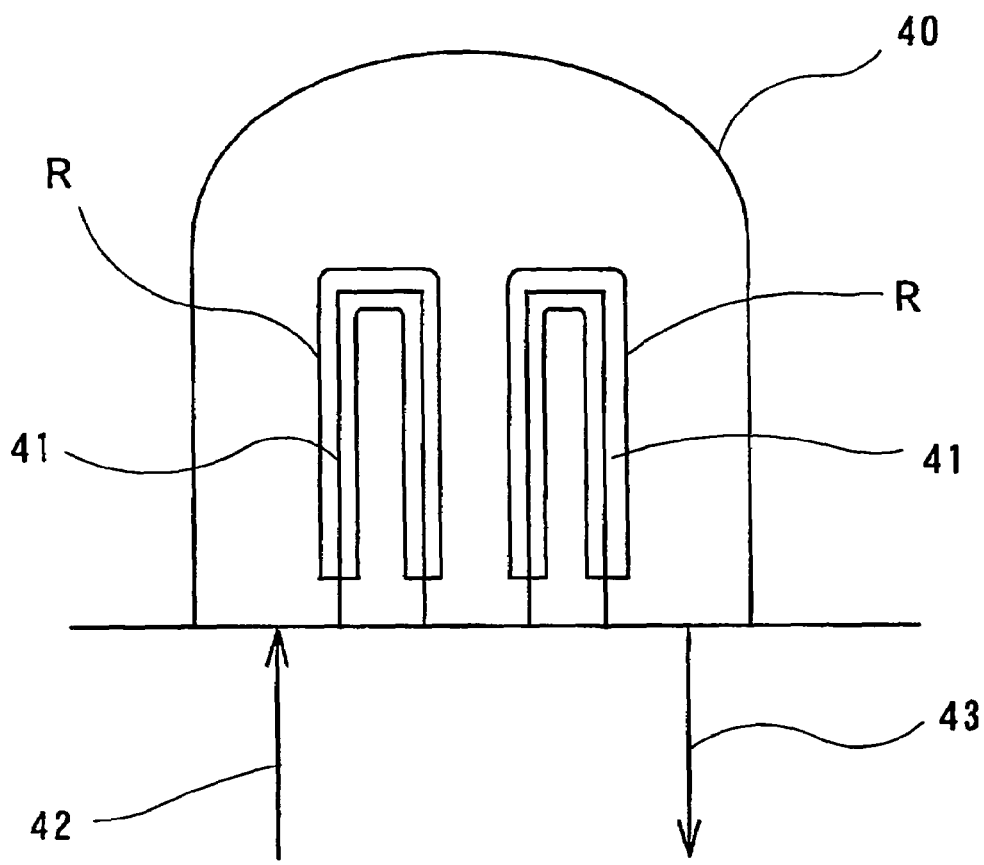
FIG. 3 is a schematic cross-sectional view to illustrate a reactor used for a depositing process in producing a raw material for single crystal silicon.

First, in the silicon depositing process, a silicon seed rod 41 disposed in a reactor 40 is heated, for example, by electric current heating, to a high temperature on the basis of a so-called Siemens process, as shown in FIG. 3. Then, raw gas is supplied into the reactor 40 through a raw gas supply pipe 42 to contact with the silicon seed rod 41, thereby polycrystalline silicon R is deposited by a reducing reaction to form a column-shaped around the silicon seed rod 41. A remaining gas in the reactor 40 is discharged to the outside through a gas discharge pipe 43.

Figure 4:
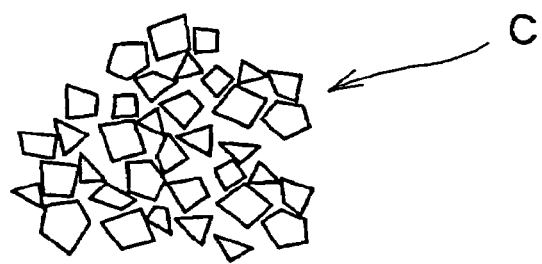
FIG. 4 is a front view to illustrate rod-shaped polycrystalline silicon which has been taken out of the reactor to be crushed into lumps.

In the crushing process, the column-shaped polycrystalline silicon R, produced in the silicon depositing process, is cracked by thermal shock for example, heating and rapid cooling. Then, the column-shaped polycrystalline silicon R is struck by a hammer so as to be crushed, thereby forming lumps of polycrystalline silicon C as shown in FIG. 4.

In the cutting process, the column-shaped polycrystalline silicon R is cut in a predetermined length using a diamond cutter, thereby forming rod-shaped polycrystalline silicon C.

In the cleaning process, lumps of polycrystalline silicon or in a rod shape is cleaned using a cleaning solution including a nitric acid and a hydrofluoric acid to remove impurities adhering to the surface thereof. In the immersing process, the polycrystalline silicon, having been completely cleaned, is immersed in a pure water bath to remove the remaining acid.

In the drying process, the polycrystalline silicon, having been immersed, is put into a vacuum drier to remove moisture from the surface thereof.

In the cleaning process, particle is removed from the surface of the polycrystalline silicon by contacting the polycrystalline silicon with ionized clean air using the above-mentioned clean bench unit 30. First, the polycrystalline silicon is put on the worktable 2 of the clean bench 1. Then, while supplying ionized clean air from above the worktable 2, the air is suctioned from a side of the worktable 2 and then discharged. Accordingly, the polycrystalline silicon and the surface of the worktable 2 are exposed to clean air to remove static electricity, so that particle is discharged along the flow of air.

Figure 5:
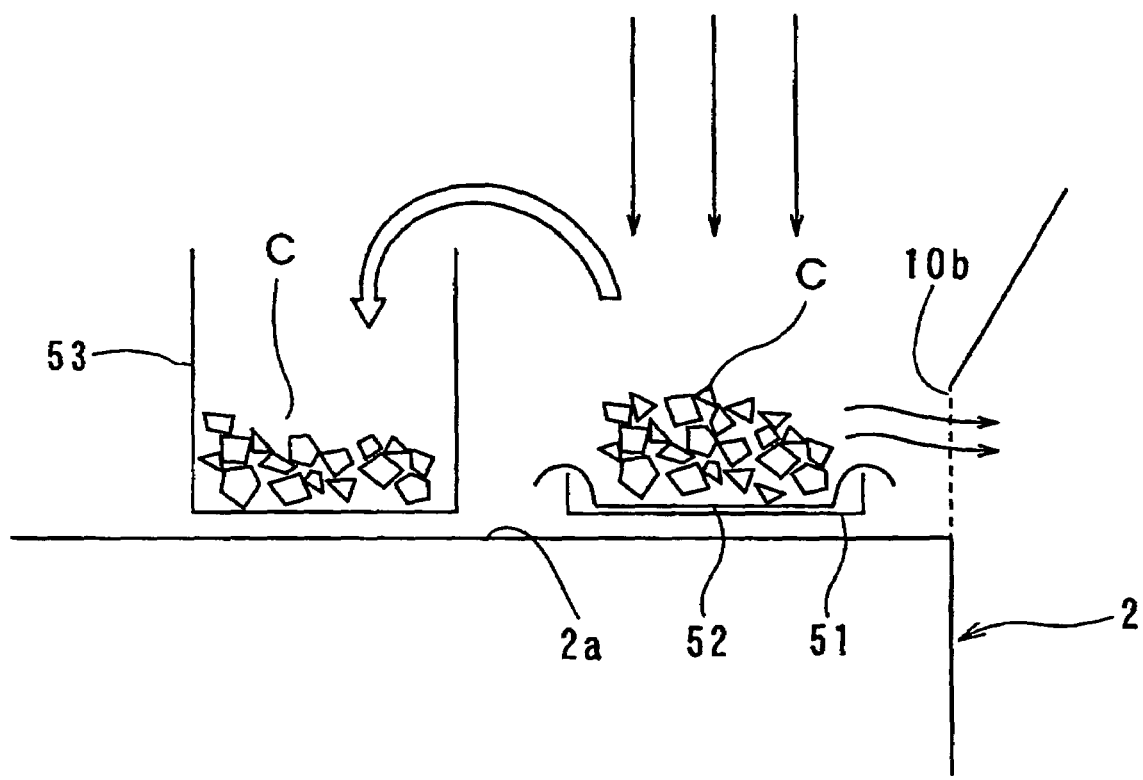
FIG. 5 is a model view to illustrate cleaning of the lumps of polycrystalline silicon on a worktable of the clean bench in FIG. 1.

The cleaning process is described with the lumps of polycrystalline silicon C in the following. As shown in FIG. 5, a polyethylene sheet 52 is laid on a polyethylene tray 51, and a plurality of lumps of polycrystalline silicon C is put on the sheet 52. The tray 51 is placed on the worktable 2 of the clean bench 1 and supplied with ionized clean air from above in the clean bench 1. In this state, individual lumps of polycrystalline silicon C are inspected in size or appearance to be sorted and put in a polyethylene packing bag 53.

In the clean bench 1 of the clean bench unit 30 according to the present embodiment, the blower 11 supplies clean air to the working space 3 through the high-performance filter 15. Air suctioned though the suction holes 10a, 10b provided in the lower part of the working space 3 and the worktable suction hole 2c is sent to the blower 11 through the worktable communicative route 5 and the communicative route 7, thereby performing air circulation. Thus, air supplied to the working space 3 has a cleanliness of about 100% due to the high-performance filter 15 disposed before the working space 3, and thus the working space 3 can be kept very clean. Accordingly, the polycrystalline silicon to be sorted is always in a clean environment so that it is not mixed with impurities in order to keep a high purity. Therefore, the deterioration in quality of single crystal silicon produced using the polycrystalline silicon as a raw material can be prevented.

In the present embodiment, clean air supplied through the supplying hole 16a is partly ionized by the ionizer 20 disposed on the lower side of the ceiling plate 16 (one side of the working space 3). The clean air includes positive and negative ions, and thus the positive and negative ions are electrically neutralized with the static electricity of the particle of the polycrystalline silicon if the particle is charged, thereby removing the static electricity. The particle from which static electricity is removed, loses adhesive power. Accordingly, the particle does not adhere to the polycrystalline silicon but suctioned to the suction holes 10a, 10b or the worktable suction hole 2c by the flow of the clean air. As a result, the particle is removed from the surface of the worktable 2 and the working space 3. As described above, static electricity is removed from the particle so that the particle can be easily eliminated from the worktable 2. Accordingly, single crystal silicon produced from polycrystalline silicon as a raw material can keep its quality high.

If the particle of the polycrystalline silicon, which is removed from the surface of the worktable 2 and the working space 3 along with air suctioned to the suction holes 10a, 10b or the worktable suction hole 2c, goes directly into the blower 11, the blower 11 may not be driven properly. In the present embodiment, however, a particle removing filter 13 is provided between the suction holes 10a, 10b of the communicative route 7 and the blower 11. Thus, the particle can be thoroughly removed from air to be sent to the blower 11 by the particle removing filter 13. As a result, the blower 11 can be properly driven without trouble, and air can be repeatedly circulated.

In the packing process, the polycrystalline silicon, thus purified, is packed in a polyethylene bag to be sent to a factory for producing single crystal silicon. This polycrystalline silicon is provided as a raw material for single crystal silicon. As described above, the surface of the polycrystalline silicon has been purified by the cleaning process in the clean bench, and thus high-quality single crystal silicon can be produced.

Although the clean bench unit 30 employing the clean bench 1 according to one embodiment of the present invention has been described above, the present invention is not limited thereto. It will be apparent that those skilled in the art can make various modifications and changes thereto within the scope of the invention.

While the embodiments have been illustrated with cleaning lumps of polycrystalline silicon, polycrystalline silicon as a raw material of single crystal silicon according to the present invention may be prepared through either crushing column-shaped polycrystalline silicon into lumps of polycrystalline silicon or cutting it into rod-shaped polycrystalline silicon with a predetermined length. As for rod-shaped polycrystalline silicon, in the cleaning process, a rod may be put on the sheet 52, for example by one, examined in appearance while being exposed to clean air, and then put in a packing bag by one.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A clean bench comprising:
   a worktable on which polycrystalline silicon is placed;
   a box part which includes side plates to surround three sides except a front face of a working space above the worktable and which includes a vertically extending part, extending from the bottom to the top of the box part, and an upper extending part, extending above the working space;
   a ceiling plate, which covers an upper side of the working space, with supplying holes formed in the ceiling plate of the box part, which supply air from the upper extending part onto an upper surface of the worktable;
   an ionizer, which ionizes the air supplied from the supplying holes to the working space and removes static electricity on the worktable;
   suction holes formed in the side plate of the box part, which suction air from the working space;
   a closed loop communicative route which communicates between the suction holes and the supplying holes;
   a partition dividing the vertically extending part from the upper extending part;
   a blower, which sends the air to the upper extending part, is provided in the vertically extending part and is disposed to contact with the partition;
   a worktable communicative route connecting a working surface of the worktable to the communicative route at a lower side surface of the worktable.

2. A clean bench consisting of:
   a worktable on which polycrystalline silicon is placed;
   a box part which includes side plates to surround three sides except a front face of a working space above the worktable and which includes a vertically extending part, extending from the bottom to the top of the box part, and an upper extending part, extending above the working space;
   a ceiling plate, which covers an upper side of the working space, with supplying holes formed in the ceiling plate of the box part, which supply air from the upper extending part onto an upper surface of the worktable;
   an ionizer, which ionizes the air supplied from the supplying holes to the working space and removes static electricity on the worktable;
   suction holes formed in the side plate of the box part, which suction air from the working space;
   a closed loop communicative route which communicates between the suction holes and the supplying holes;
   a partition dividing the vertically extending part from the upper extending part;
   a blower, which sends the air to the upper extending part, is provided in the vertically extending part and is disposed to contact with the partition; and;
   a worktable communicative route connecting a working surface of the worktable to the communicative route at a lower side surface of the worktable.

3. The clean bench according to claim 1, further comprising:
   a first filter which removes particles from the air sent to the blower, wherein the first filter is provided between the suction holes and the blower, and
   a second filter with a flat plate shape provided in the upper extending part and extending parallel to the ceiling plate which is parallel to the flow of air directly from the blower and partially extending under a portion of the partition.

4. The clean bench according to claim 3, wherein the first filter removes particles having a diameter range of approximately 10 μm or greater.

5. The clean bench according to claim 3, wherein the second filter removes particles having a diameter range of approximately 0.3 μm or greater.

* * * * *